United States Patent
Dafner et al.

(10) Patent No.: US 8,762,952 B2
(45) Date of Patent: Jun. 24, 2014

(54) RECORDING METHOD CALLS THAT LED TO AN UNFORESEEN PROBLEM

(75) Inventors: Asaf Dafner, Gedera (IL); Sigal Korczyn, Bnei-Tsylon (IL); Yelena Langleyben, Ramat-Gan (IL); Shiri Semo Judelman, Kfar-Saba (IL)

(73) Assignee: BMC Software, Inc., Houston, TX (US)

( * ) Notice: Subject to any disclaimer, the term of this patent is extended or adjusted under 35 U.S.C. 154(b) by 657 days.

(21) Appl. No.: 12/967,204

(22) Filed: Dec. 14, 2010

(65) Prior Publication Data

US 2012/0151284 A1  Jun. 14, 2012

(51) Int. Cl.
- *G06F 9/44* (2006.01)
- *G06F 11/07* (2006.01)
- *G06F 11/36* (2006.01)

(52) U.S. Cl.
CPC ............... *G06F 11/0766* (2013.01); *G06F 11/3612* (2013.01)
USPC ....................................... 717/127

(58) Field of Classification Search
CPC .................. G06F 11/0766; G06F 11/3612
USPC ....................................... 717/127
See application file for complete search history.

(56) References Cited

U.S. PATENT DOCUMENTS

| | | | |
|---|---|---|---|
| 4,598,364 A | 7/1986 | Gum et al. | |
| 5,121,489 A | 6/1992 | Andrews | |
| 5,193,180 A | 3/1993 | Hastings | |
| 5,335,344 A | 8/1994 | Hastings | |
| 5,410,685 A | 4/1995 | Banda et al. | |
| 5,446,876 A | 8/1995 | Levine et al. | |
| 5,465,258 A | 11/1995 | Adams | |
| 5,481,740 A | 1/1996 | Kodosky | |
| 5,513,317 A | 4/1996 | Borchardt et al. | |
| 5,526,485 A | 6/1996 | Brodsky | |
| 5,590,354 A | 12/1996 | Klapproth et al. | |
| 5,632,032 A | 5/1997 | Ault et al. | |
| 5,740,355 A | 4/1998 | Watanabe et al. | |
| 5,848,274 A | 12/1998 | Hamby et al. | |
| 5,870,606 A | 2/1999 | Lindsey | |
| 5,928,369 A | 7/1999 | Keyser et al. | |
| 5,938,778 A | 8/1999 | John, Jr. et al. | |
| 5,940,618 A | 8/1999 | Blandy et al. | |

(Continued)

FOREIGN PATENT DOCUMENTS

| | | | |
|---|---|---|---|
| EP | 1826668 A1 | * | 8/2007 |
| WO | WO9605556 A1 | | 2/1996 |

OTHER PUBLICATIONS

Abramson et al. "A Debugging Tool for Software Evolution", CASE-95, 7th International Workshop on Computer-Aided Software Engineering, Jul. 1995.

(Continued)

*Primary Examiner* — Wei Zhen
*Assistant Examiner* — Lanny Ung

(57) ABSTRACT

A technique assists in resolving problems by aiding in the determination of the root cause of the problem. The technique allows recording of information about methods of executing applications that encounter problems, even if the method was not previously marked for recording. Upon detection of a problem, the method and all other methods on the current execution stack may be marked for retrospective recording. When each method exits, information about entry conditions and exit conditions of each method may be recorded for presentation to a user of the application for problem resolution.

19 Claims, 7 Drawing Sheets

(56) References Cited

U.S. PATENT DOCUMENTS

| | | | |
|---|---|---|---|
| 5,983,366 | A | 11/1999 | King |
| 6,003,143 | A | 12/1999 | Kim et al. |
| 6,202,199 | B1 | 3/2001 | Wygodny et al. |
| 6,282,701 | B1 | 8/2001 | Wygodny et al. |
| 6,321,375 | B1 | 11/2001 | Blandy |
| 6,374,369 | B1 | 4/2002 | O'Donnell |
| 6,467,052 | B1 | 10/2002 | Kaler et al. |
| 7,058,928 | B2 | 6/2006 | Wygodny et al. |
| 7,386,839 | B1 | 6/2008 | Golender et al. |
| 7,721,154 | B1 * | 5/2010 | Jaamour et al. ............ 714/38.14 |
| 7,774,172 | B1 * | 8/2010 | Yunt et al. .......................... 703/2 |
| 2003/0005414 | A1 | 1/2003 | Elliott et al. |
| 2003/0066054 | A1 * | 4/2003 | Aarts et al. .................... 717/129 |
| 2007/0220370 | A1 * | 9/2007 | Branda et al. ................... 714/49 |

OTHER PUBLICATIONS

BMC Software, Inc. "BMC AppSight Application Problem Resolution System, Optimizing Application Development Processes Throughout the Application Lifecycle," 8 pages, 2006.

BMC Software, Inc. "BMC AppSight Application Problem Resolution System for J2EE With Black Box Software Technology," 2 pages, 2006.

Bruegge, Bernd et al. "A Framework for Dynamic Program Analyzers," Conference on Object-Oriented Programming Systems, Languages, and Applications (OOSLA'93), Washington, pp. 65-82, Sep. 1993.

Larus, James R. "Efficient Program Tracing," IEEE Software magazine, May 1993, pp. 52-61.

Netzer, Robert H. B. et al. "Optimal Tracing and Replay for Debugging Message-Passing Parallel Programs," IEEE, pp. 502-511, 1992.

Netzer, Robert H. B. et al. "Optimal Tracing and Replay for Debugging Shared-Memory Parallel Programs," ACM/ONR Workshop on Parallel and Distributed Debugging, May 1993.

Netzer, Robert H. B., et al. "Optimal Tracing and Incremental Reexecution for Debugging Long-Running Programs," ACM SIGPLAN Conference on Programming Language Design and Implementation, Jun. 1994.

Plattner, Bernhard, et al. "Monitoring Program Execution: A Survey," IEEE Computer, pp. 76-93, Nov. 1981.

Schieber, Colleen D., et al. "RATCHET: Real-time Address Trace Compression Hardware for Extended Traces," Performance Evaluation Review vol. 21 #3 and 4, Apr. 1994.

Spinellis, Diomidis. "Trace: A Tool for Logging Operating System Call Transactions," Operating Systems Review, vol. 28, No. 4, pp, 56-63, Oct. 1994.

Timmerman et al. "High Level Tools for the Debugging of Real-Time Multiprocessor Systems," IEEE, pp. 140-146, 1993.

Tsai, Jeffrey J.P. , et al. "A Noninvasive Architecture to Monitor Real-Time Distributed Systems," IEEE Software, pp. 11-23, Mar. 1990.

\* cited by examiner

○ RECORDING (ARGUMENTS) AT METHOD ENTRANCE
◐ RECORDING (RETURN VALUE) AT METHOD EXIT

RECORDING METHOD CALLS THAT LED TO AN UNFORESEEN PROBLEM

BACKGROUND

This disclosure relates generally to the field of computer software. More particularly, but not by way of limitation, it relates to techniques for recording information about problems that arise during execution of computer software.

Identifying and resolving problems that may arise in computer applications is of great importance to users of those applications. Some vendors have provided computer software products that are able to help in problem resolution of applications by recording real-time logs of user actions and code execution flow via instrumentation techniques such as code injection. Although such products are beneficial, they do not always record the information needed to identify and resolve the problems that occur in applications. The problem resolution products cannot record every action and every event all the time, because that would produce too much data and would greatly hurt traced application performance. Some vendors provide problem resolution products for object-oriented applications that use a "recording profile" to list which methods should be recorded. Large applications, however, where such problem resolution products would be most beneficial, may create environments with over one million methods. In such an environment, only a few hundred pre-determined methods typically are marked for recording. The other methods, may be are instrumented but are typically not recorded. Thus, problems that arise in any but the pre-determined method may occur, but the problem resolution techniques fail to record the necessary information.

Solving problems in applications in such an environment can be difficult and require significant time and resources, including a need to rerun the application possibly multiple times to attempt to reproduce the problem to try to pinpoint its root cause.

SUMMARY

In one embodiment, a method is disclosed. The method discloses actions comprising detecting a problem during execution of a first method of an object of application on a computer, setting a first recording indicator associated with the first method responsive to the act of detecting a problem, and recording at exit from the first method a first information comprising entry conditions of the first method, responsive to the first recording indicator.

In another embodiment, a computer readable medium is disclosed. The computer readable medium has stored thereon instructions for a programmable control device wherein the instructions cause a programmable control device to perform the method described above.

In yet another embodiment, a networked computer system is disclosed. The networked computer system comprises a first computer, a second computer, communicatively coupled to the first computer, and software executing on the first computer and the second computer. The software executing on the first computer performs actions that comprise detecting a problem during execution of a first method of an object of application on a computer, setting a first recording indicator associated with the first method responsive to the act of detecting a problem, and recording at exit from the first method a first information comprising entry conditions of the first method, responsive to the first recording indicator. The software executing on the second computer performs actions that comprise presenting the first information to a user of the application.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The following description is at times written using terminology and examples using JAVA®, J2EE®, or J2SE® components or environments. (JAVA, J2EE, and J2SE are registered trademarks of Oracle America, Inc.) Nevertheless, the present invention is not limited to such components or environments, and may be embodied in other programming languages, components, or environments as desired.

Figure 1:
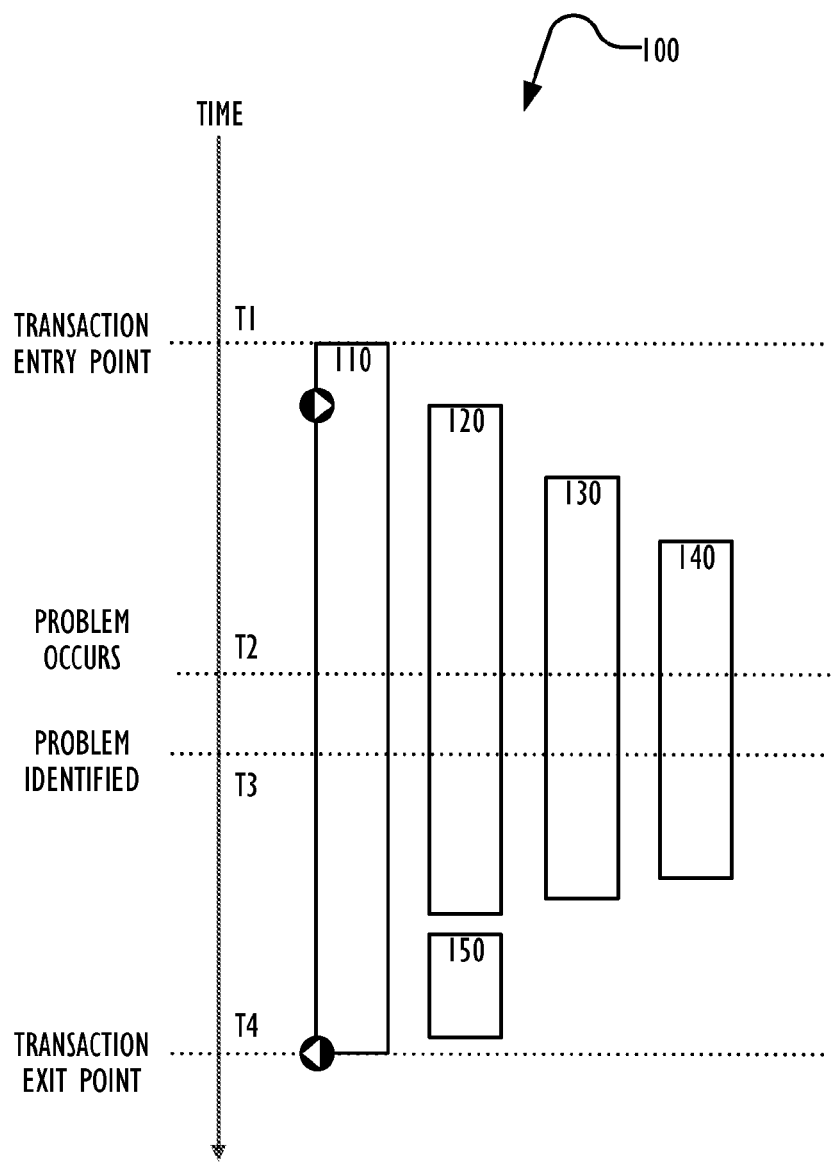
FIG. 1 is a graph illustrating the shortcomings of a typical problem resolution technique 100 according to the prior art.

FIG. 1 is a graph illustrating the shortcomings of a typical problem resolution technique 100 according to the prior art. This conventional technique can identify a problem that has just happened. For example, the technique can produce an alert when a duration threshold defined for a certain servlet was crossed. The technique can accompany that alert with information recorded for all business methods that were called around that point and were marked for recording in advance, but where the problem occurs in a method that is not recorded, valuable information may be lost.

In FIG. 1, a transaction begins at time T1, with the execution of method 110. A recording profile of the problem resolution software allows an administrator to select the methods for which information is to be recorded. The problem resolution software instruments those methods to ensure that certain information is recorded. In this example, method 110 is a key business method (e.g. a login servlet.doGet( ) method). As such, an administrator has listed method 110 in the recording profile and information is recorded regarding the execution of method 110. A problem (e.g., a duration threshold breach) occurs at time T2 and is identified at time T3 during execution of method 110. The problem resolution software can report an alert and connect it to the recorded method 110. Because method 110 was identified in the recording profile, information about its arguments was recorded at entrance to the method, and information about its return value was recorded at exit at time T4.

In this example, however, the actual problem occurs during the execution of method 140, which was called by method 130, which was called by method 120, which was called by the instrumented method 110. Method 150 is not part of the recording profile, so it is not recorded at entry or exit, but it is not in the stack of methods that led to the problem, even though it was called by method 110.

Although method 110 is selected for recording, methods 120, 130, and 140 are not identified as important methods in advance, and thus are not included in the recording profile. When the problem is identified at time T3, the code for these methods has already been called and their entry conditions were not recorded, because methods 120, 130, and 140 are not in the recording profile. The stack that led to the problem in method 140 is not recorded and cannot be displayed to the user.

Therefore, in the conventional technique, the problem resolution software does not record methods that led to the problem and were not part of the recording profile. The root cause for a problem often lies in the stack that led to the error. Users cannot identify in advance which methods will lead to problems. Even if they could, marking too many methods for recording all of the time would impose an unacceptably big performance overhead cost.

Figure 2:
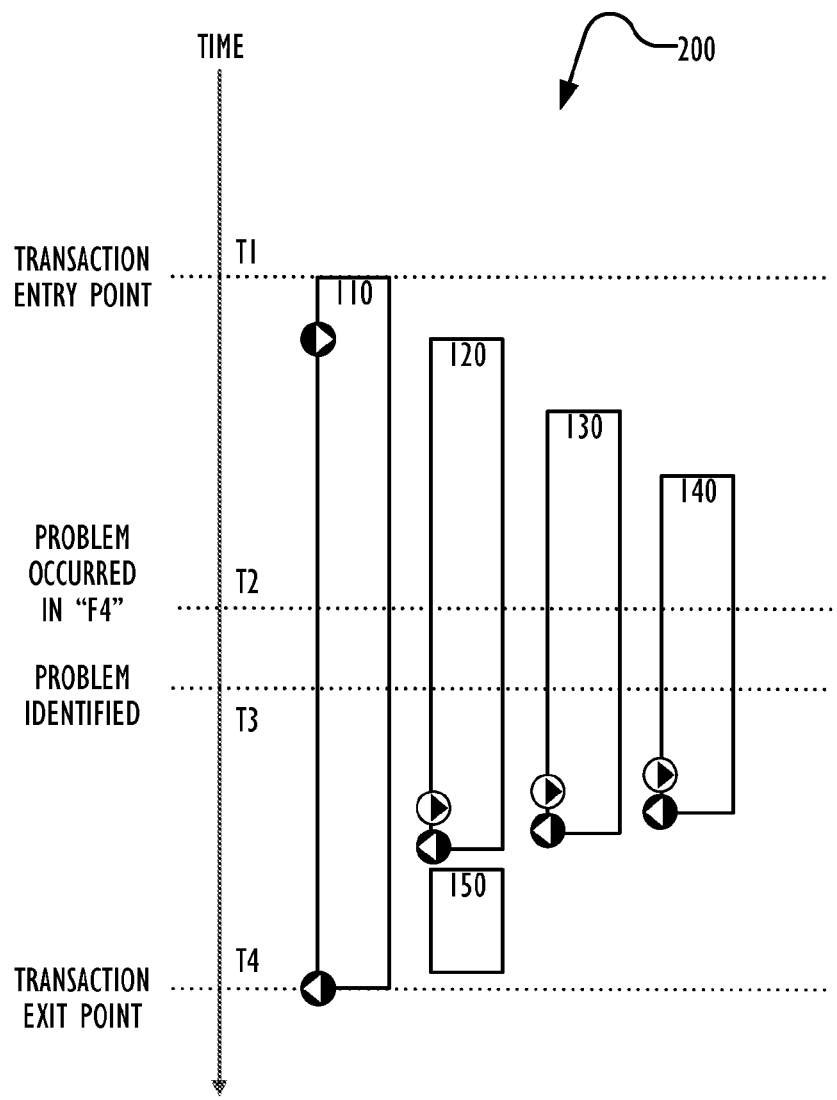
FIG. 2 is a graph illustrating an overview of a technique for reducing the amount of recording without loss of problem resolution information according to one embodiment.

FIG. 2 is a graph illustrating an overview of a general solution to the problem identified above according to one embodiment. Once a problem is identified in method 140, embodiments may dynamically change the recording profile to include all methods in the current stack (adding methods 120, 130, and 140 in this example). The updated recording profile indicates that these methods should be recorded as they exit. Arguments and object state information are recorded at the method exit as if they were traced at the method entrance. The return value may also be recorded just as if the methods 120, 130, and 140 were part of the original recording profile.

The methods 120, 130, and 140 may be executed in multiple threads of the application, only some of which encounter a problem. The methods 120, 130, and 140 are recorded only in the thread experiencing a problem, not in the other threads that did not encounter any problems.

After the methods 120, 130, and 140 exit, the recording profile that was updated because of the problem is cleared, to avoid recording them on a future invocation unless a problem is encountered. Thus, a method that is invoked repeatedly may be recorded only for those invocations in which a problem is detected during the execution of that method, or which was in the execution stack at the time of the problem. For example, just as in FIG. 1, method 150, which is also invoked by method 110, but which is not in the execution stack at time T2 or T3, would not be recorded unless it was identified for recording in the pre-determined recording profile.

Figure 3:
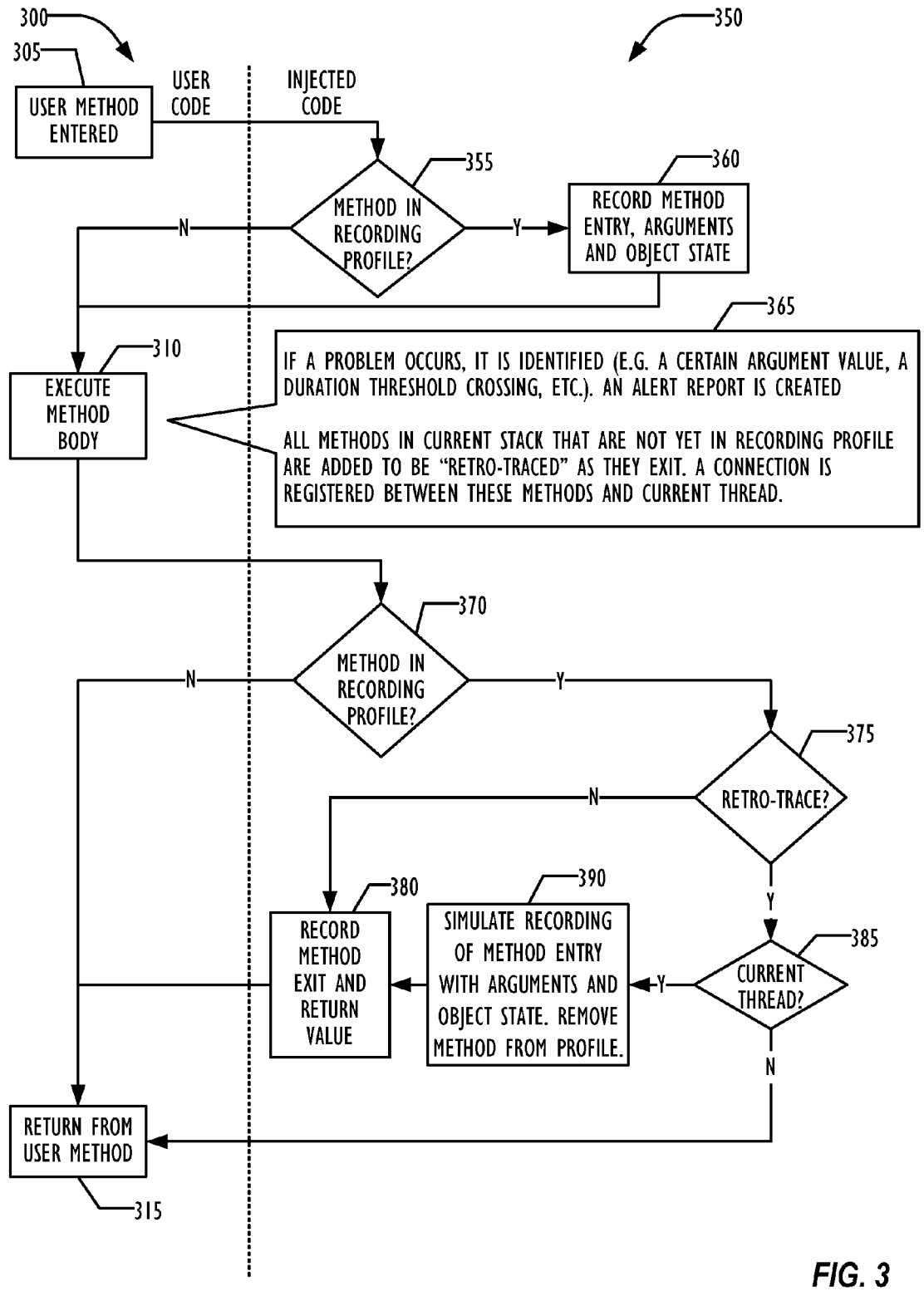
FIG. 3 is a flowchart illustrating an overview of a technique for recording problems in a method according to one embodiment.

FIG. 3 is a flowchart illustrating an overview of a technique for recording problems in a method 300 according to one embodiment. In this embodiment, code is injected into the user's code for the method before execution to provide the instrumentation for recording problems. On the left side of FIG. 3 are blocks indicating the execution of the user code of the method 300. On the right side of FIG. 3 are blocks indicating the execution of the injected code 350.

In block 305, the user code for the method is entered upon invocation of the method. Prior to execution, reporting code is injected into the method that performs the reporting function. In block 355, the injected code 350 determines whether this method was pre-identified for recording by checking the recording profile for that method. If the method 300 was profiled for recording, then in block 360 information about the entry state of the method is recorded. In one embodiment, this entry state information may comprise arguments passed to the method 300, the time of entry, and any other desired information about the object with which method 300 is associated.

If the method 300 is not marked for recording or after the recording has been performed in block 360, the method 300 body is executed in block 310.

At some point during the execution of the method 300 a problem may occur and be detected in block 365. For example, the problem may be that a transaction duration has exceeded a threshold value. This determination may occur during the execution of the method 300, even though the root cause of the problem may be in another method that directly or indirectly invoked the method 300. The detection of a problem may occur anywhere, including external to the application of which method 300 is a part, and using a technique desired for detecting the problem.

Other examples of problems that may occur and be detected in various embodiments include (a) arguments passed to the method 300 that have inappropriate values, including null values, (b) a return value generated by the method that has an inappropriate value, (c) conditions that exist upon invocation of the method 300 that meet or fail to meet certain criteria, (d) conditions that would exist upon exit from the method 300 that meet or fail to meet certain criteria, etc. the list of problems given above is illustrative and by way of example only, and other problems may occur and be detected. In one embodiment, the problems identified and responded to as described herein do not include exceptions that may be thrown by the method 300. In such an embodiment, exceptions may be caught and dealt with using other mechanisms, such as JAVA try and catch blocks.

In other embodiments, exceptions may be caught and the actions taken handled as described herein. Where a non-exception problem is detected and handled, other than marking the method 300 for retrospective recording and exit, no other action is taken, and execution of the method 300 is not interrupted or otherwise altered at that time, but is allowed to complete normally.

When the problem is identified and is to be handled as described herein, the method 300 and all methods in the stack of the current thread are added to the recording profile to be recorded as they exit. An association between the methods to be recorded and the current thread may be made, to avoid recording other instances of those methods in other threads.

Eventually the method 300 exits. Prior to invocation, code is injected into the method 300 to cause recording actions to be performed prior to the actual exit from the method 300. In block 370, the injected code checks the recording profile to see if the method 300 is to be recorded. If not, the method 300 simply returns in block 315 with very low overhead caused by the recording check of block 370.

If the method 300 is to be recorded, then in block 375 a determination is made whether the method 300 is recorded normally or retrospectively because of a detected problem.

If the recording is the result of a pre-invocation selection for recording, then in block 380 the return value for the method 300 is recorded, along with an indication that the method is exiting. In one embodiment, the indication is time stamped, to allow determining when the method exited, and if being recorded normally, the duration of execution of the method 300.

If the recording is being done retrospectively, then in block 385 a check is made whether this instance is executing in the current thread that had the problem. If not, recording is bypassed and the method 300 is allowed to exit in block 315. If the method 300 is in the current thread, then in block 390 a simulation of the recording that would have been performed that entry to the method may be performed. Although the recording cannot record the entry time for the method 300, the recording may include object state information and argument values. An assumption is made that the object state and argument values have not been modified during execution of the method 300, because there is no way to know whether such a change has occurred.

Following the retrospective recording of entry information in block 390, the technique continues with normal recording of exit information in block 380, and finally the actual exit from the method in block 315.

Because every method on the execution stack was flagged for retrospective recording at the time of the problem execution, the technique of FIG. 3 is performed not just for the method executing at the time of problem identification, but for every method in the execution stack, thus providing a more complete collection of information, without the unacceptable overhead of recording every invocation of those methods.

Numerous techniques may be used for implementing a recording profile for use as described above. In one embodiment, an object may keep track of all methods in use in an application by maintaining a memory map of what is to be recorded. In another embodiment, the class definitions used in the application may be modified to store the recording profile for the class in the class, with separate entries for each method implemented by that class. In one embodiment, each entry may be defined as a simple bitmap, allowing as many types of recording as there are bits in the bitmap, which allows checking the bitmap for a zero value as a quick check to determine if any recording types have been set. Thus, for example, a 32-bit integer value we provide for thirty-two different types of recording by using each bit for a different type of recording. Alternately, arithmetic values may be defined as recording types. Although only two types of recording are described herein, embodiments may wish to use multiple types of recording to distinguish different types of data that is to be recorded when set in the recording profile.

In some embodiments, an application developer or user may be allowed to change the recording profile for a method at runtime. A user interface, such as a graphical user interface (GUI), may be provided for ease of setting or updating the recording profile. In such embodiments, the code 350 injected into the method 300 may check the profile at entry into the method 300 and exit. If the profile indicates recording at either time, the injected code 350 records the selected information. By allowing the user to update the profile during runtime, it is possible for recording to be performed only at entry and not exit, or only at exit and not at entry, in addition to recording at both entry and exit.

Figure 4:
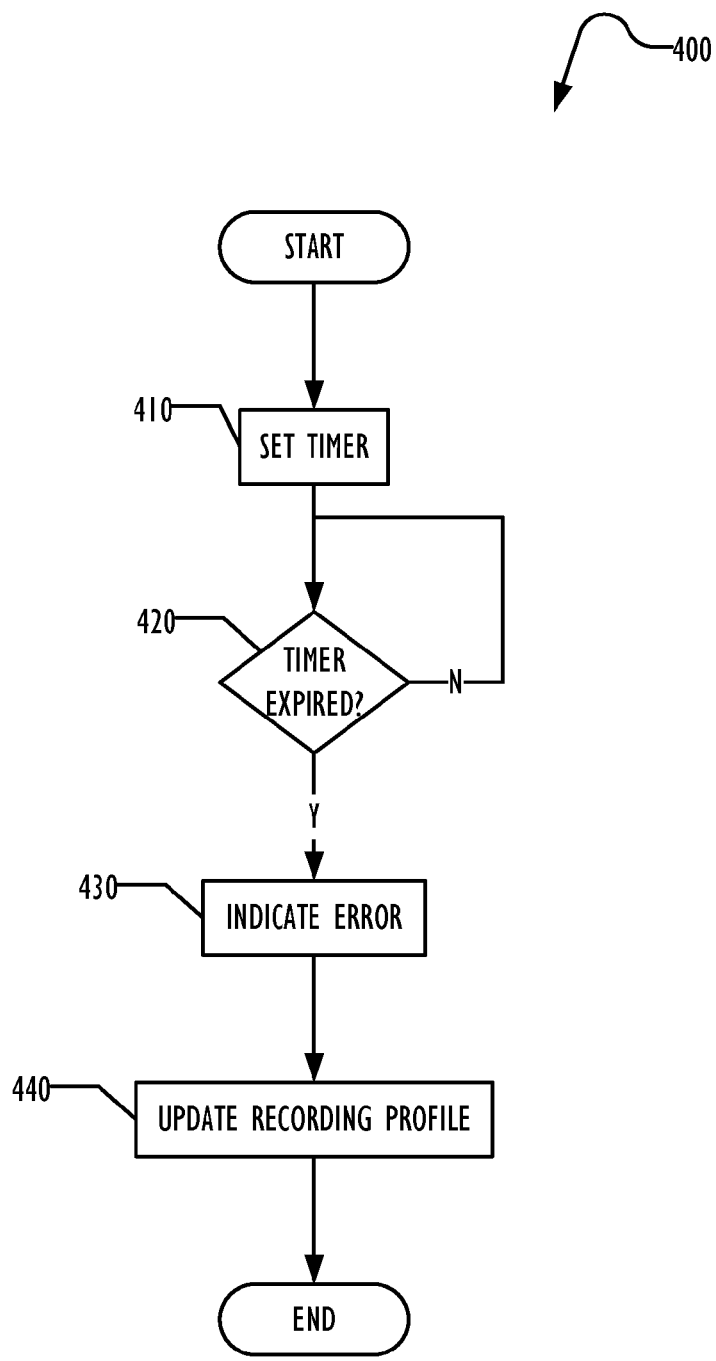
FIG. 4 illustrates, in flowchart form, a technique for identifying and indicating an error condition according to one embodiment.

One example of a technique for identifying and indicating an error condition checks whether a transaction has exceeded the threshold duration. Transactions that take too long to complete may indicate a problem with the application. Thus in one embodiment, a clock may be started upon beginning a transaction, then checked in a separate thread. FIG. 4 is a flowchart illustrating such an embodiment. In block 410, a timer is set for the transaction. Then in block 420, the timer may be repeatedly checked for expiration. If the timer expires before the method 300 completes, then an error has occurred. In block 430, the error may be indicated, in the form of one or more messages to a user, an entry log file, or any other desired type of error indication. Then, in block 440, the recording profile for the relevant methods on the execution stack may be updated for retrospective logging, which causes the recording technique described above to be performed upon exit from those methods. In some embodiments, the actions of blocks 430 and 440 would be performed in reverse order, marking the methods in the stack for recording prior to logging the error.

Figure 5:
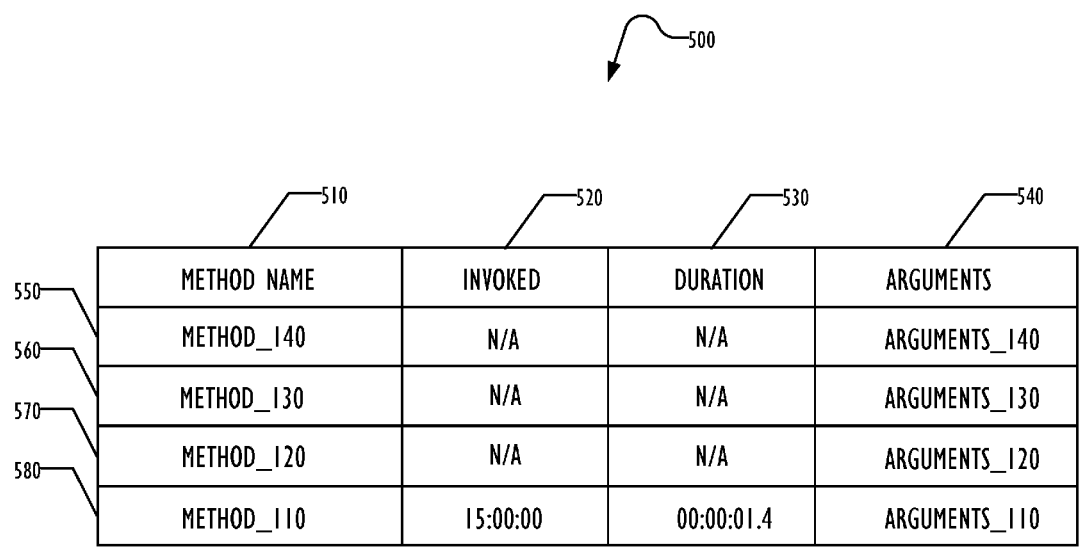
FIG. 5 illustrates one embodiment of a presentation of recorded information to a user of an application.

In one embodiment, recorded information may be displayed in a graphical user interface, such as is illustrated in FIG. 5. In this example display, the method name 510, entry time 520, duration 530, and arguments at entry to the method 540 are illustrated for methods 110-140 in rows 550-580. Method 110 was profiled for recording at every invocation. Methods 120-140 were retrospectively profiled upon the occurrence of an error during their execution. Because methods 120-140 were retrospectively recorded, their entry time 510 and duration 520 are unknown, as indicated by the "N/A" in those columns in rows 550-570. The format and contents of the display 500 are illustrative and by way of example only, and other techniques for presenting the reported information can be used as desired, including non-display formats such as writing to a log file.

In one embodiment, upon exiting from a method that has been retrospectively recorded, the recording profile for the method may be updated to remove the indication that the method is to be retrospectively recorded. In a further embodiment, to avoid removing the retrospective recording indication too early if the method has been marked for retrospective recording in more than one thread, a thread count may be maintained to indicate the number of threads in which retrospective recording has been requested for that method. In such an embodiment, instead of eliminating the indication that the method is to be retrospectively recorded if the thread count is greater than 1, the thread count may be decremented. Only if the thread count reaches zero is the recording profile changed to stop retrospective recording of that method. In one embodiment, a new class may be created to hold the thread counters for an application.

Figure 6:
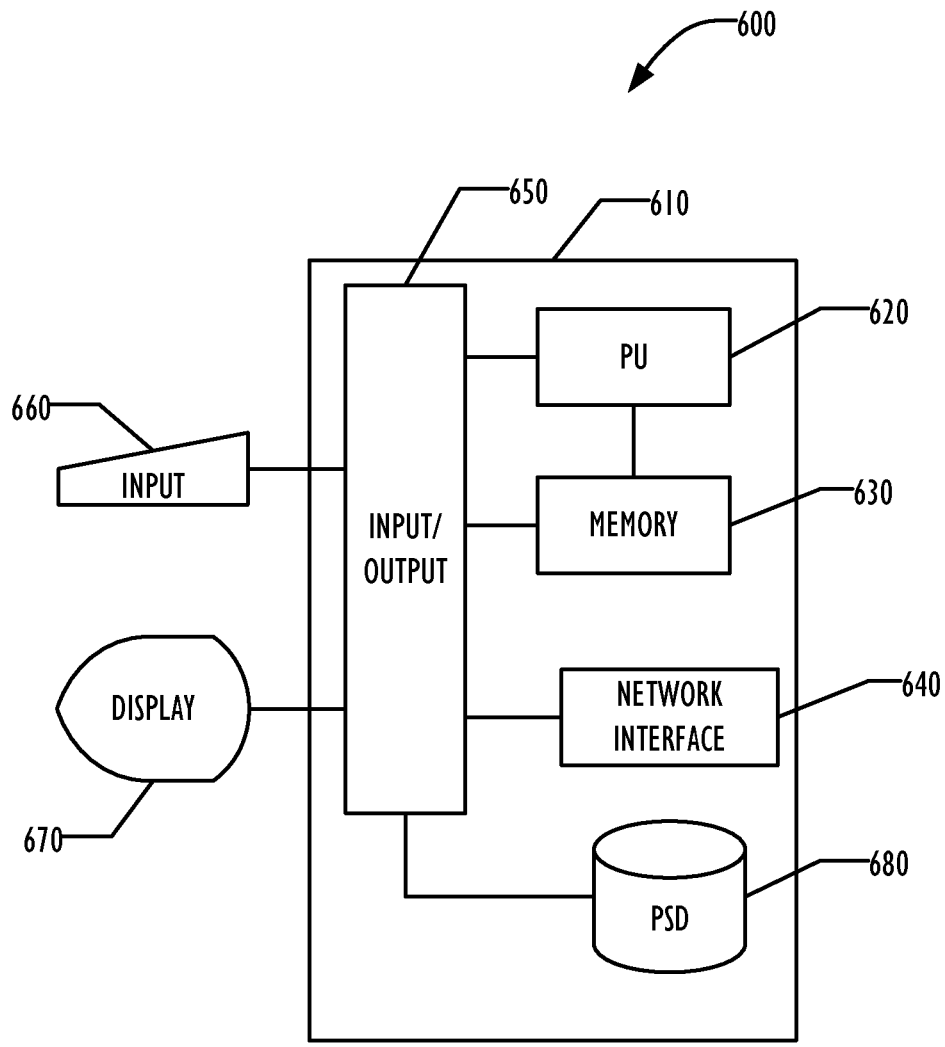
FIG. 6 illustrates, in block diagram form, a computing device programmed to perform methods according to one embodiment.

Referring now to FIG. 6, an example computer FIG. 600 for use in providing a retrospective recording of a method of an object is illustrated in block diagram form. Example computer FIG. 600 comprises a system unit FIG. 610 which may be optionally connected to an input device or system FIG. 660 (e.g., keyboard, mouse, touch screen, etc.) and display FIG. 670. A program storage device (PSD) FIG. 680 (sometimes referred to as a hard disc) is included with the system unit FIG. 610. Also included with system unit FIG. 610 is a network interface FIG. 640 for communication via a network with other computing and corporate infrastructure devices (not shown). Network interface FIG. 640 may be included within system unit FIG. 610 or be external to system unit FIG. 610. In either case, system unit FIG. 610 will be communicatively coupled to network interface FIG. 640. Program storage device FIG. 680 represents any form of non-volatile storage including, but not limited to, all forms of optical and magnetic, including solid-state, storage elements, including removable media, and may be included within system unit FIG. 610 or be external to system unit FIG. 610. Program storage device FIG. 680 may be used for storage of software to control system unit FIG. 610, data for use by the computer FIG. 600, or both.

System unit FIG. 610 may be programmed to perform methods in accordance with this disclosure (an example of which is in FIG. 3). System unit FIG. 610 comprises a processor unit (PU) FIG. 620, input-output (I/O) interface FIG. 650 and memory FIG. 630. Processing unit FIG. 620 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory FIG. 630 may include one or more memory modules and comprise random access memory (RAM), read only memory (ROM), programmable read only memory (PROM), programmable read-write memory, and solid-state memory. One of ordinary skill in the art will also recognize that PU FIG. 620 may also include some internal memory including, for example, cache memory.

Figure 7:
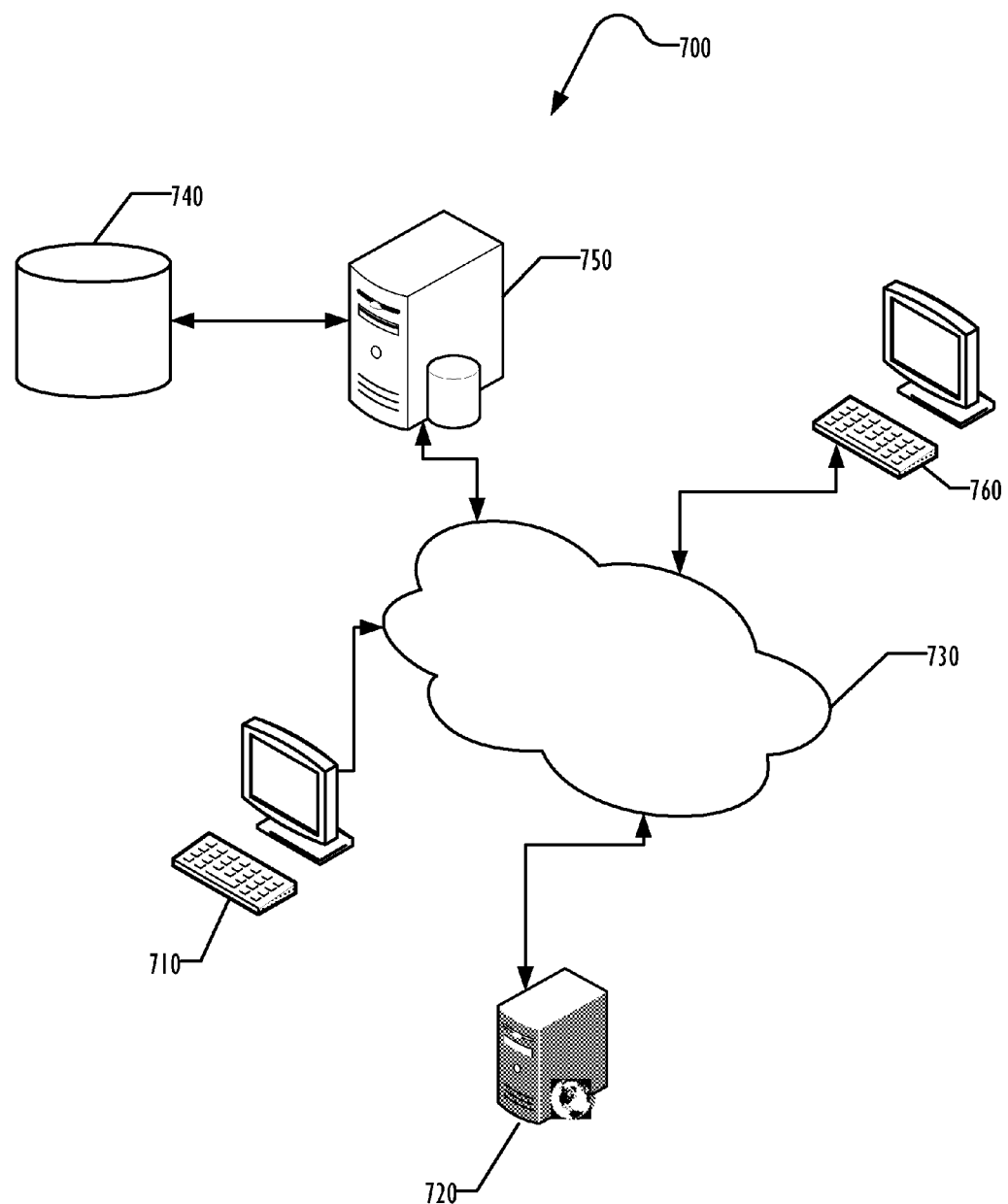
FIG. 7 illustrates, in block diagram form, a network of computers programmed to perform methods according to one embodiment.

FIG. 7 is a block diagram illustrating a networked system 700 embodying the techniques described above. A user workstation computer 710 may be used to define and update recording profiles for applications running on the one or more of database server 750, workstation computer 760, and Web server 720. The database server 750 may control database 740. A network 730 connects all of the computers of system 700. Although illustrated as a single network 730 in FIG. 7, the network 730 may comprise a plurality of interconnected networks. The user of workstations 710 in some embodiments may view the recorded information using a GUI or other interface as described above.

The actual methods whose execution is recorded may execute on any of the computers 720, 750, and the 760. Other types of computers, including other types of servers, may be execution platforms for the techniques described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
   executing, on a computer, a first method in a first thread of an application, the first method included in a plurality of methods included in a stack associated with the first thread, the inclusion of a method in the stack based on an instance of the method being executed in the first thread; and without interrupting the execution of the first method:
   detecting a problem during the execution of the first method; and
   responsive to detecting the problem:
     adding the plurality of methods included in the stack to a recording profile;
     associating a respective recording indicator with each of the plurality of methods added to the recording profile; and
     setting the respective recording indicator associated with the first method; and
   recording, at exit from the first method and responsive to the setting of the respective recording indicator for the first method, a first information comprising entry conditions of the first method.

2. The method of claim 1, further comprising:
   presenting the first information to a user of the application.

3. The method of claim 1, further comprising:
   recording, at exit from the first method and responsive to the setting of the respective recording indicator for the first method, a second information comprising exit conditions of the first method.

4. The method of claim 3, further comprising:
   presenting the second information to a user of the application.

5. The method of claim 1, further comprising:
   setting another recording indicator associated with the first method prior to execution of the first method;
   recording, at entry to the first method and responsive to the setting of the other recording indicator, a third information comprising entry conditions of the first method; and
   recording, at exit from the first method and responsive to the setting of the other recording indicator, a fourth information comprising exit conditions of the first method.

6. The method of claim 5, further comprising:
   presenting the third information and the fourth information to a user of the application.

7. The method of claim 1, wherein the entry conditions of the first method include arguments passed to the first method at entry to the first method.

8. The method of claim 1, wherein detecting a problem during the execution of the first method comprises:
   detecting that a transaction involving the first method has exceeded a predetermined duration threshold.

9. The method of claim 1, further comprising:
   identifying a second method included in the recording profile;
   setting the respective recording indicator associated with the second method; and
   recording, at exit from the second method and responsive to the setting of the respective recording indicator for the second method, a second information comprising entry conditions of the second method and a third information comprising exit conditions of the second method.

10. The method of claim 9, further comprising:
    presenting the second information and the third information to a user of the application.

11. The method of claim 1, further comprising:
    recording, at exit from the first method and responsive to the setting of the respective recording indicator for the first method, a second information comprising exit conditions of the first method.

12. The method of claim 11, further comprising:
    resetting, at exit from the first method and responsive to recording the second information, the respective recording indicator for the first method, the resetting removing the respective recording indicator for the first method from the recording profile.

13. The method of claim 1, wherein
associating a respective recording indicator with each of the plurality of methods added to the recording profile comprises:
defining a respective variable for each of the plurality of methods, each respective variable included in a class that implements each of the plurality of methods, the respective variables comprising the recording profile; and wherein setting the respective recording indicator associated with the first method comprises:
defining a first value for the respective variable for the first method.

14. The method of claim 13, wherein the first value for the respective variable for the first method is indicative of at least one type of information to be recorded corresponding to the first method.

15. The method of claim 13, further comprising:
defining a second value for the respective variable for the first method, the second value indicative of entry and exit conditions of the first method as a types of information to be recorded corresponding to the first method; and
recording, during every invocation of the first method and responsive to defining the second value for the respective variable for the first method, the entry and exit conditions of the first method.

16. The method of claim 1, wherein detecting a problem during the execution of the first method comprises:
identifying the first thread as an execution thread corresponding to the problem, and wherein recording, at exit from the first method and responsive to the setting of the first recording indicator, a first information comprising entry conditions of the first method comprises:
recording at exit from the first method the first information only if the method is executing in the execution thread corresponding to the problem.

17. A method comprising:
detecting a problem during execution of a first method of an object of application on a computer;
setting a first recording indicator associated with the first method responsive to detecting the problem;
adding, responsive to the setting of the first recording indicator, the first recording indicator to a recording profile associated with the first method;
recording, at exit from the first method and responsive to the first recording indicator, a first information comprising entry conditions of the first method; and
removing, at exit from the first method, the first recording indicator from the recording profile associated with the first method only if the problem was detected in an execution thread corresponding to the problem.

18. A non-transitory computer readable medium with instructions for a programmable control device stored thereon, wherein the instructions cause the programmable control device to:
execute a first method in a first thread of an application, the first method included in a plurality of methods included in a stack associated with the first thread, the inclusion of a method in the stack based on an instance of the method being executed in the first thread; and without interrupting the execution of the first method:
detect a problem during the execution of the first method; and
responsive to detecting the problem:
add the plurality of methods included in the stack to a recording profile;
associate a respective recording indicator with each of the plurality of methods added to the recording profile; and
set a first recording indicator associated with the first method;
and
record, at exit from the first method and responsive to the setting of the first recording indicator, a first information comprising entry conditions of the first method.

19. A networked computer system comprising:
a first computer;
a second computer, communicatively coupled to the first computer;
software executing on the first computer that performs actions comprising:
executing a first method in a first thread of an application, the first method included in a plurality of methods included in a stack associated with the first thread, the inclusion of a method in the stack based on an instance of the method being executed in the first thread; and without interrupting the execution of the first method:
detecting a problem during the execution of the first method; and
responsive to detecting the problem:
adding the plurality of methods included in the stack to a recording profile;
associating a respective recording indicator with each of the plurality of methods added to the recording profile; and
setting a first recording indicator associated with the first method; and
recording, at exit from the first method and responsive to the setting of the first recording indicator, a first information comprising entry conditions of the first method; and
software executing on the second computer that performs actions comprising:
presenting the first information to a user of the application.

* * * * *